March 21, 1944. E. L. RAIRDON 2,344,637
VEHICLE DIRECTION SIGNALING SYSTEM
Filed Dec. 29, 1941 2 Sheets-Sheet 1

INVENTOR
ERNEST LORENZO RAIRDON
BY
Harry C Schroeder
ATTORNEY.

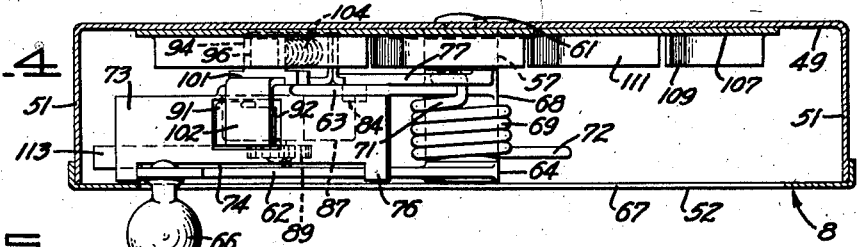
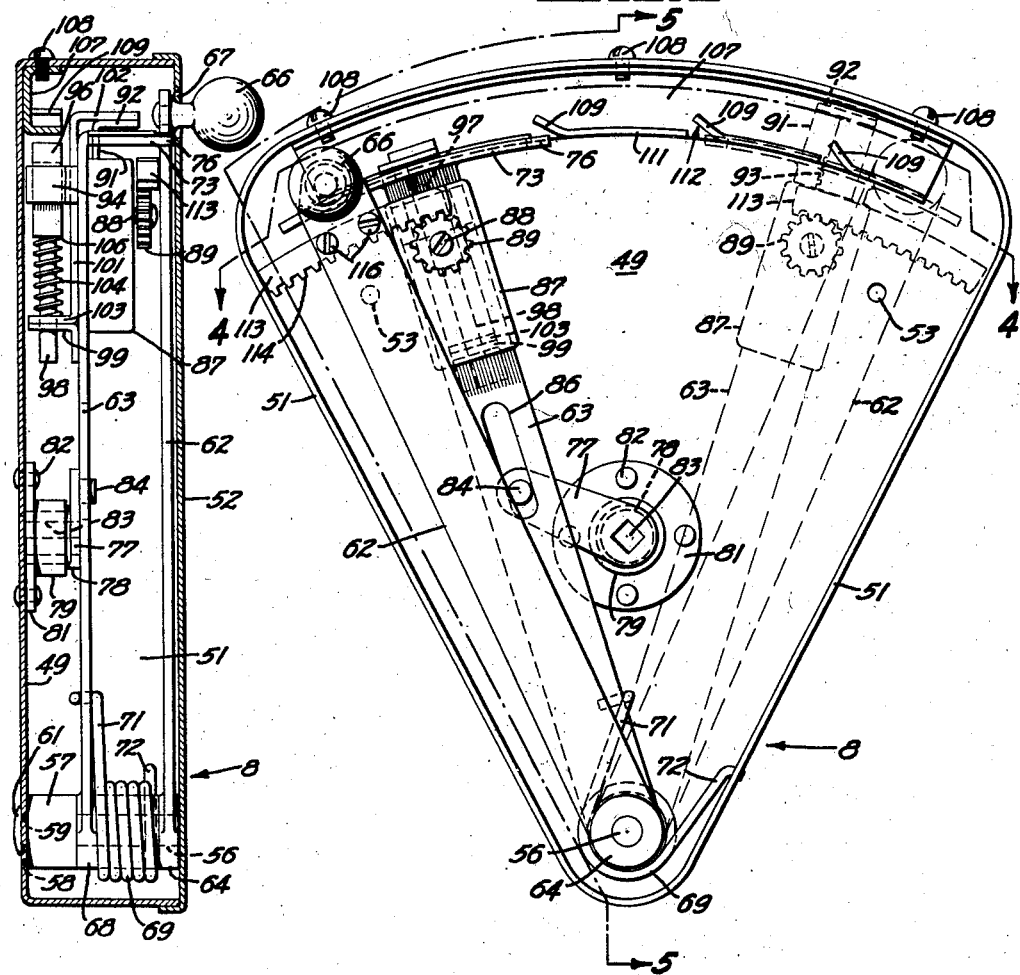

Patented Mar. 21, 1944

2,344,637

UNITED STATES PATENT OFFICE 2,344,637

VEHICLE DIRECTION SIGNALING SYSTEM

Ernest Lorenzo Rairdon, Oakland, Calif.

Application December 29, 1941, Serial No. 424,714

15 Claims. (Cl. 116—52)

This invention relates to signals of the semaphore type and particularly to such a signal adapted for use on a vehicle.

It is an object of the invention to provide a signal mechanism, of the class described, which may be mounted on the structure of a vehicle without seriously defacing said structure should it be desired later to permanently remove said signal mechanism from the vehicle.

Another object of the invention is to provide a signal which may be made, by a simple movement of the operator's arm or hand, to give a signal indication and to maintain said indication during a predetermined interval of time, thereafter automatically cancelling said signal indication and conditioning the mechanism for further operation.

A further object of the invention is to provide a signal mechanism which, during operation and by one or a series of distinctly audible signals, will inform the operator of the nature of the signal indication being given.

Still another object of the invention is to provide a signal mechanism, comprising individual operating and signal-indicating units, which may be made to operate by remote control without the requirement of a complicated linkage or cord-and-pulley transmission system between the separated operating and signal-indicating units.

A further object of the invention is to provide a direction signal which is entirely mechanical in operation and therefore not likely to fail at a critical moment or to give an erroneous signal indication.

Yet another object of the invention is to provide a direction signal mechanism which is of compact, sturdy and fool-proof construction.

It is a further object of the invention to provide a direction signal mechanism which can be mounted exteriorly of a vehicle body without creating an unsightly, dangerous or view-obstructing projection from said body.

It is another object of the invention to provide, in a vehicle signal of the semaphore type, means operative by movement of the semaphore arm through the air for assisting movement of the arm between positions thereof.

The invention possesses other objects and features of advantage which, together with the foregoing, will be specifically brought out in the detailed description of the invention hereunto annexed. It is to be understood that the invention is not to be limited to the specific form thereof herein shown and described as various other embodiments thereof may be employed within the scope of the appended claims.

Referring now to the drawings:

Figure 4 is a horizontal sectional view of the control unit of the mechanism. The plane in which the view is taken is indicated by the line 4—4 of Figure 6.

Figure 5 is a vertical sectional view of the control unit taken in the plane indicated by the line 5—5 of Figure 6.

Figure 6 is a front elevational view of the control unit with the housing cover removed.

Figure 1:
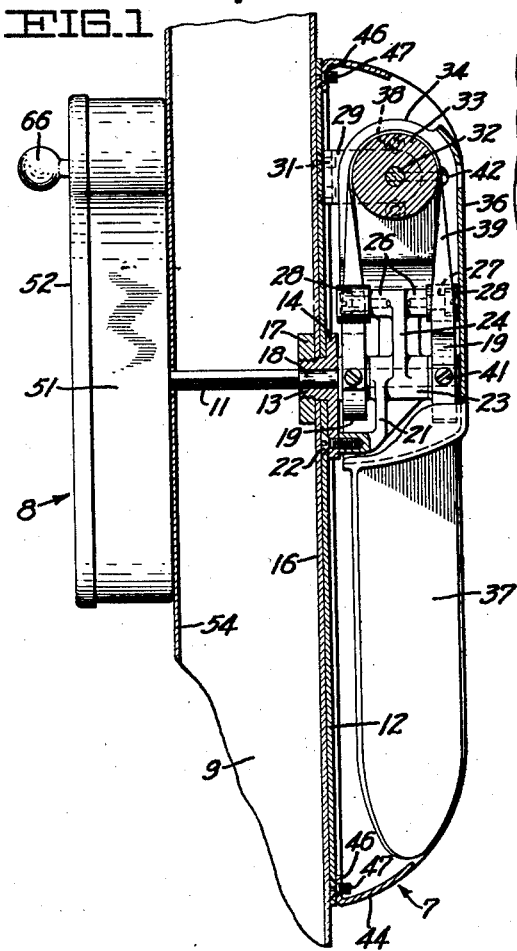
Figure 1 is a view, partly in side elevation and partly in vertical section showing the complete direction signal mechanism of my invention. The plane, in which the sectional portion of the view is taken, is indicated by the line 1—1 of Figure 2.

The direction signal of my invention is composed of two separate units, as shown in Figure 1, namely the signal unit, generally indicated by the numeral 7 and the control unit generally indicated by the numeral 8. Both units may be mounted, in a preferred relationship, on a wall section or door 9 of a vehicle; a shaft 11 being provided operatively connecting the units together. Instead of being mounted in closely adjacent relationship, as shown in the drawings, it may be desirable to locate the signal unit 7 at quite a distance from the control unit 8 in which case an extended flexible shaft, similar to the familiar speedometer cable and substituted for the rigid square shaft 11, could be employed without departing from the spirit of the invention.

The signal unit

Figure 2:
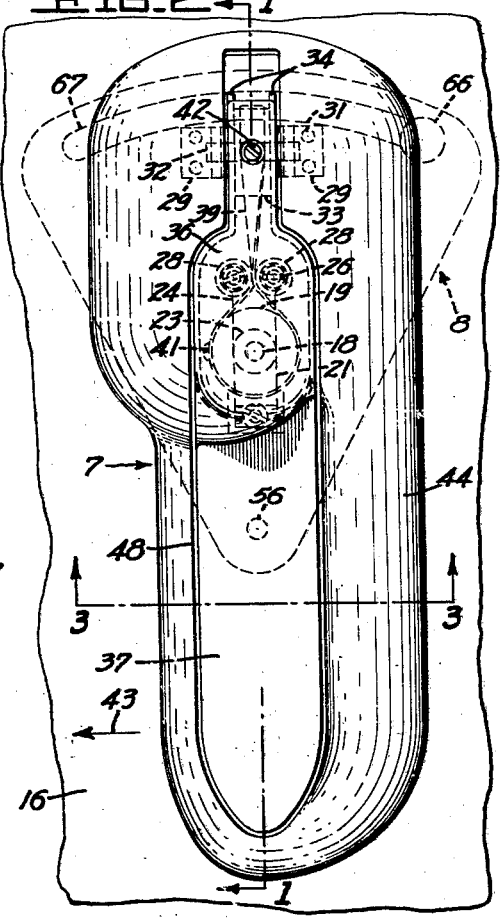
Figure 2 is a front elevational view of the structure shown in Figure 1.
Figure 3:
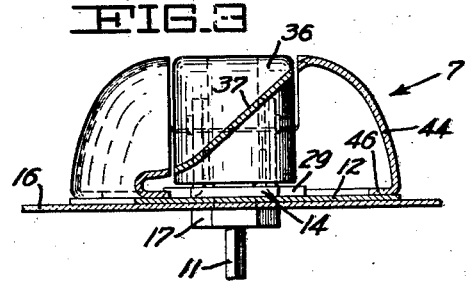
Figure 3 is a vertical sectional view, of the signal unit only, taken in the plane indicated by the line 3—3 of Figure 2.

The signal unit 7 comprises a base-plate 12 having a substantially centralized aperture therein through which the threaded stem 13, secured to a flange 14 engaging and secured to the outer surface of the base plate, extends. The flange 14 is secured by screws or by any other suitable means to the base plate. The stem 13 projects through an aperture formed in the outer door or wall panel 16 and a nut 17, threadedly engaged with the stem and engaging the inner surface of the door or wall panel 16, is provided for securely attaching the base plate 12 to the vehicle. A cylindrical portion 18 of the shaft 11 journaled in a central bore provided in the stem 13, projects outwardly beyond the flange 14 and carries a pair of relatively spaced reel drums 19. A bracket 21, secured at its lower end by screws 22 to the flange 14, carries a centrally bored hub 23, journaled on the cylindrical portion of the shaft 18 and is provided with an upward extension 24 carrying a pair of hubs 26 the latter being tapped to receive threaded studs 27 upon which are journaled guide rolls 28. A pair of brackets 29, secured by screws 31, or otherwise, to the base plate 12 above the position of the shaft 18, journals a transverse pivot shaft 32 upon which is mounted a semaphore-actuating rotor 33 and the apertured ears 34 of a semaphore arm, comprising a recessed body 36, formed integrally with the ears 34 and enclosing the reel drums 19 and rolls 28, provided with a coextensive vane 37. The vane 37, as will be seen in Figure 3, lies in a plane angularly disposed with respect to the axis of the pivot shaft 32 for the purpose to be presently described. The ears 34 are secured to and for rotary movement with the rotor 33 by means of screws 38 connecting the parts together. A flexible metallic, preferably phosphor-bronze, ribbon 39 is provided, looped over the rotor 33 and having its respective ends secured by anchor screws 41 to the reel drums 19. An additional anchor screw 42, threadedly mounted in the rotor 33, secures the ribbon 39, at a point substantially medially of its ends, to the rotor. It will be noted that each of the anchor screws 41 and 42 passes radially through the reel drums 19 and the rotor and also into apertures formed in the shafts 18 and 32 thus functioning to secure the ribbon 39 to the reel drums and rotor and to secure the latter to, and for rotation with, the shafts 18 and 32. As will be seen in Figure 1, the ribbon 39 leaves the inner reel drum 19 tangentially in a clockwise direction, passes under the inner guide roll 28, is twisted through 90 degrees and passes upwardly and over the rotor 33, is again twisted through 90 degrees as it descends from the rotor, passes under the outer guide roll 28 and is then passed, in a counter-clockwise direction around the greater portion of the periphery of the outer reel drum. It will be seen therefore that when the shaft 18 is rotated, in a direction to wind the ribbon onto the inner reel drum 19, the ribbon will be simultaneously and equally unwound from the outer reel drum thereby causing rotations of the rotor 33 which will swing the semaphore arm outwardly and upwardly to a desired signaling position. The inclination of the vane 37 is such, as will be seen in Figure 3, that when the semaphore arm is in a signaling position and the vehicle is moving in the direction of the arrow 43 of Figure 2, the pressure of the air against the upper slanting surface of the vane will tend to force the semaphore downwardly to its normal or non-indicating position. In order to cut down the wind resistance of the signal unit, projecting beyond the outer surface of the vehicle body, I provide an enclosure housing 44, provided with a marginal flange 46 secured by screws 47 to the base plate 12, which is considerably streamlined and shaped to form into the contours of the semaphore arm; the latter nesting into a complementarily shaped aperture 48 formed in the enclosure housing.

*The control unit*

This unit includes means for effecting rotary movement of the shaft 18, for holding the shaft in a fixed position of rotation during a predetermined interval of time while a signal is being indicated and for automatically counter-rotating the shaft so as to cancel the signal indication. The control unit comprises a substantially triangularly shaped housing having a base plate 49 provided with a marginal flange 51 and fitted with a closure or cover plate 52. Apertures 53, formed in the base plate 49, are adapted to receive mounting screws, not shown, by means of which the control unit may be mounted on the inner door or wall panel 54 as shown in Figure 1. Positioned adjacent the lower end of the base plate 49 is a pivot shaft 56 having an integral collar 57 formed thereon, and engaging the inner surface of the base plate 49, provided with a stud 58 passing through an aperture 59 provided in the base plate and formed with a riveted head 61 securely mounting the pivot shaft 56 thereon. Provided in the control unit housing is a control lever 62 and a latch lever 63 disposed in parallel relation to the control lever. The control lever has a hub 64 journaled on the pivot shaft 56 and, at its upper end, is provided with a grip knob 66, which extends from the housing through an arcuate slot 67 formed in the cover plate 52, by means of which the control lever may be manually moved through an arc of travel within the housing. The latch lever 63 is provided, at its lower end, with a comparatively longer hub 68 journaled on the pivot shaft 56 and a coiled torsion spring 69, having one end extension 71 thereof engaging a side of the latch lever, at a point thereon radially spaced from the axis of the pivot shaft, and the other end extension 72 thereof anchored in an aperture formed in the housing flange 51, is provided for forcibly urging the latch lever toward a normal "off" position at one side of the housing which, as viewed in Figure 6, is the left-hand side thereof. The upper end of the latch lever 63 is fitted with an integral, horizontally directed and arcuately extended arm 73 having a longitudinally extending notch 74 therein in which the control lever 62 is positioned and along which the latter may be moved. Stops 76, defining the opposite ends of the notch 74 are engageable by the control lever so as to connect the control and latch levers for movement together as will be presently described. A shaft lever 77, having a hub 78 journaled in a centrally-apertured boss 79 carrying a flange 81 secured by screws or rivets 82 to the base plate 49, is provided with a squared aperture 83, or other such means for connection with the square shaft 11 or the flexible shaft hereinbefore described, and is further provided, at its distal end, with a crank pin 84 disposed and operable within an elongated aperture 86 formed in the latch lever 63. It will be seen that when the latch lever 63 is moved, in the control housing, along its arcuate path of travel, rotary movement will be imparted to the shaft 11 due to the connection between the shaft lever 77 and the latch lever. This will effect movement of the semaphore arm through its various signaling positions as was previously described.

Means is provided for latching the latch lever in one of several positions along its path of travel so as to effect a signal indication of the semaphore arm, means is also provided for maintaining the latched position of the latch lever for a predetermined interval of time so as to display the signal for a corresponding interval and means is further provided, operable at the end of said interval of time, for unlatching the latch lever to cancel the displayed signal. Secured to the latch lever 63, adjacent the upper end of the latter, is a timing mechanism consisting of a casing 87 having a winding shaft 88 rotatively mounted therein, with an end portion extending from the casing 87 and provided with a pinion gear 89; the timer being also provided with a traveller 91 having an angularly bent flange 92 formed at its upper end. The timer may be one of several familiar types, preferably one which utilizes a train of gears driven by a mainspring which may be wound by rotating the shaft 88 in the proper direction and which simultaneously causes the traveller 91 to be projected upwardly from the timer housing, the traveller being connected, by means of the rack teeth 93 formed on a side thereof, to the gear train so that when the mainspring is wound up the traveller will be extended upwardly from the timer housing and as the mainspring unwinds, in driving the gear train, the traveller will be gradually drawn downwardly toward the timer housing. The resistance to unwinding of the mainspring may be caused by a friction governor or by a rotating vane carried by the high speed gear of the train thus causing the timer to operate during an extended predetermined interval of time. Mounted for slidable movement, vertically, in a square guide aperture formed in an upper bracket 94 secured to the latch lever 63, is a square ratchet pawl 96 having an angularly inclined upper end surface 97 and a downwardly extending cylindrical stem 98 which slidably passes through an apertured lower guide bracket 99 also secured to the latch lever below the upper guide bracket 94. A slide 101, guided in an aperture formed in the upper guide bracket 94, is mounted on and capable of movement longitudinally of the latch lever and is provided with upper and lower end flanges 102 and 103. The upper end flange 102 is secured to the flange 92 of the timer traveller 91 and the lower flange 103 has therein an aperture through which the stem 98 of the ratchet pawl slidably passes. A coil spring 104 concentrically surrounding the stem 98 has one end thereof engaging the upper surface of the lower end flange 103 and the other end thereof engaging the shoulder 106 formed at the junction of the square ratchet pawl 96 and its cylindrical stem 98. The uncompressed length of the spring 104 is such that the ratchet pawl will, in its lower position of rest, be positioned, relative to the adjacent mechanism, as shown in Figure 5. A ratchet, comprising an arcuate-channel-shaped bar 107 is attached by screws 108 or otherwise to the marginal flange 51 of the housing and is positioned directly above the ratchet pawl 96. Tongues 109, struck up from the lower flange 111 of the ratchet provide ratchet notches 112 located at the desired signal positions. An arcuate rack 113, whose teeth 114 are in mesh with the teeth of the pinion gear 89, is secured by screws 116, or their equivalent, to the control lever 62.

When the control lever 62 is moved from left to right, as viewed in Figure 6, that is, from its normal "off" position toward any one of the three signal positions represented by the ratchet notches 112, a series of actions occurs. First, since the control lever is free of the latch lever 63 and since the torsional force of the spring 69 is materially greater than that of the unwound mainspring of the timer 87, the control lever will be moved first to pass the rack 113 over the pinion gear 89 thus winding the timer mainspring before the control lever engages the stop 76 and the control and latch levers are engaged for simultaneous movement. While the timer mainspring is being wound, during the primary movement of the control lever, the traveller 91 is being projected upwardly from the timer thereby causing the slide 101 to move upward, correspondingly, and to elevate the ratchet pawl 96 until the upper end of the latter engages the underside of the lower ratchet bar flange 111. The upward movement of the traveller 91 and slide 101, however, is much greater than the distance through which the pawl must be moved to engage the flange 111 of the ratchet bar with the result that after the upward movement of the pawl has been stopped, the slide will continue its upward movement thereby compressing the spring 104 between the flange 103 and the shoulder 106 and pressing the upper end of the pawl, with considerable force, against the surface of the flange 111. When, during its movement, the control lever 62 contacts the remote stop 76, the control and ratchet levers will become connected and will move in unison sliding the upper end of the ratchet 96 along the ratchet bar flange 111 until the ratchet registers with and snaps, under the influence of the compressed spring 104, into the first of the ratchet notches 112. This will have moved the shaft lever 77 through 45 degrees of arc and, since the movement ratio between the shaft lever 77 and the semaphore arm is unity, the semaphore arm will be moved outwardly and upwardly from its housing to a position equalling 45 degrees with respect to the vertical axis of the vehicle, or similar to an arm signal for "stop." If it is desired to give another signal, other than "stop," the movement of the control lever is continued until the ratchet registers and snaps into either of the two remaining ratchet notches 112. Movement of the control lever past the first or second ratchet notches is possible due to the sloping end surface 97 of the ratchet pawl being capable of riding out of a notch along the sloping tongues 109 thereof when pressure is applied to the control lever in a direction toward said sloping sides of the notches. The second ratchet notch represents an arcuate travel of 90 degrees of the shaft lever 77 so that the semaphore arm will be moved through a corresponding arc to a position at right angles with the vertical axis of the vehicle or corresponding to an arm signal for "left turn." Engagement of the ratchet pawl with the third ratchet notch of the series will have moved the shaft lever 77 through 135 degrees of arc and the semaphore will have moved correspondingly or, in other words, to a position elevated 45 degrees with respect to the horizontal, equivalent to an arm signal for "right turn." During movement of the control lever, one or a series of distinctly audible clicks will be heard by the operator, as the ratchet pawl snaps into the ratchet notch or notches thereby informing the operator, without the necessity of visual observation, of the nature of the signal being displayed. After the operator has moved the control lever to the desired position, as evidenced by the number of clicks heard, he releases the control lever. Immediately the mainspring of the timer 87 will start to unwind thereby lowering the traveller 91 and its connected slide 101 until whatever compressive force remaining in the spring 104 is dissipated whereupon the ratchet pawl 96 will start to descend until it passes out of the ratchet notch thereby freeing the latch lever from engagement with the ratchet bar and permitting the torque spring 69 to return the latch lever and also the control lever to their normal "off" positions as shown in Figure 6. This will, of course, also return the semaphore arm to its normal concealed position within the enclosure housing 44 thus concealing the displayed signal. The length of time that the signal is displayed depends on the construction of the timer 87, very satisfactory operation of the signal having been obtained with a timer setting of from five to ten seconds. Any interval greater than five seconds will give ample time for making most turns with the assurance that the semaphore arm will be maintained in its operative position during the complete turn.

From the foregoing description of my invention it will be seen that the direction signal of my invention will form a very desirable addition to a vehicle by enabling the driver thereof, especially in inclement weather, to very quickly and accurately flash direction signals to following or approaching vehicles or pedestrians without the necessity of opening the window of or reaching from the driver's compartment. It will also be seen that but two major apertures are required in the wall or door panel for mounting the signal; that these apertures may be easily concealed, in the event that permanent removal of the signal from the vehicle is desired by providing small bolt-like cover caps for the apertures; that the signal and control units may be made to cooperate at considerable relative distances by the addition of a simple flexible shaft; that the distinctly audible alarm produced by the device will preclude the posting of erroneous signals; that the operation of the signal, beyond the action of the operator in primarily setting it, is entirely automatic; that the construction of the mechanism makes mechanical failures very unlikely; and that the particular design of the semaphore arm permits the arm to return to its "off" position in a materially shorter time than if gravity alone were relied upon.

Having thus described my invention in detail what I claim as new, and desire to secure by Letters Patent, is:

1. A direction signal comprising a signal unit having an enclosure housing provided with an opening, a semaphore arm pivotally mounted in said enclosure housing and movable exteriorly thereof through said opening into one of a series of at least three exposed signaling positions, a rotatable member in said enclosure housing, means connecting said rotatable member with and to move said semaphore arm, a remote control unit comprising a housing, a latch lever and a separate control lever pivotally mounted in said control unit housing, movable within limits relative to said latch lever, and movable through a series of at least three signaling positions, a rotary member in said housing connected with and to be rotated by said latch lever, means connecting said rotatable and rotary members of the signal and control units, respectively, together for synchronous movement, a ratchet within said control unit housing having spaced notches therein indicating at least three of said signaling positions, an extensible ratchet pawl carried by said latch lever and movable, with the latch lever, along said ratchet and across said notches thereof, means carried by said latch lever and operable upon movement of said control lever for projecting said latch pawl toward said ratchet and into a notch thereof, and means thereafter operable for withdrawing said ratchet pawl from said notch.

2. A direction signal comprising a signal unit having an enclosure housing provided with an opening, a semaphore arm pivotally mounted in said enclosure housing and movable exteriorly thereof through said opening into one of a series of at least three exposed signaling positions, a rotatable member in said enclosure housing, means connecting said rotatable member with and to move said semaphore arm, a remote control unit comprising a housing, a latch lever and a separate control lever pivotally mounted in said control unit housing, movable within limits relative to said latch lever, and movable through a series of at least three signaling positions, a rotary member in said housing connected with and to be rotated by said latch lever, means connecting said rotatable and rotary members of the signal and control units, respectively, together for synchronous movement, a ratchet within said control unit housing having spaced notches therein indicating at least three of said signaling positions, an extensible ratchet pawl carried by said latch lever and movable, with the latch lever, along said ratchet and across said notches thereof, means carried by said latch lever and operable upon movement of said control lever for projecting said latch pawl toward said ratchet and into a notch thereof, means thereafter operable for withdrawing said ratchet pawl from said notch, and means for yieldably resisting said withdrawal of the ratchet pawl from said notch.

3. A direction signal comprising a signal unit having an enclosure housing provided with an opening, a semaphore arm pivotally mounted in said enclosure housing and movable exteriorly thereof through said opening into one of a series of at least three exposed signaling positions, a rotatable member in said enclosure housing, means connecting said rotatable member with and to move said semaphore arm, a remote control unit comprising a housing, a latch lever and a separate control lever pivotally mounted in said control unit housing, movable within limits relative to said latch lever, and movable through a series of at least three signaling positions, a rotary member in said housing connected with and to be rotated by said latch lever, means connecting said rotatable and rotary members of the signal and control units, respectively, together for synchronous movement, a ratchet within said control unit housing having spaced notches therein indicating at least three of said signaling positions, an extensible ratchet pawl carried by said latch lever and movable, with the latch lever, along said ratchet and across said notches thereof, means carried by said latch lever for projecting said latch pawl toward said ratchet and into a notch thereof, said means including a rotatable actuating element, means carried by said control lever and engaging said actuating element for rotating the latter when said control lever is moved, means for withdrawing said ratchet pawl from said notch, and means for yieldably resisting said withdrawal of the ratchet pawl from said notch.

4. A direction signal comprising a signal unit having an enclosure housing provided with an opening, a rotor journaled in said enclosure housing, a semaphore arm carried by said rotor and movable exteriorly of said enclosure housing, through said opening thereof, into one of a series of at least three signaling positions, a drive shaft journaled in said enclosure housing, means connecting said rotor and drive shaft together for synchronous rotation, a control unit, positioned at a distance from said signal unit, comprising a housing having a rotary element therein connected with said drive shaft, a latch lever connected with and to rotate said rotary element, an arcuate ratchet bar having therein a series of notches defining at least three of said signaling positions, a ratchet pawl movably mounted on said ratchet lever and adapted to be reciprocally moved toward and from said ratchet bar so as to engage one of said notches thereof, means for moving said latch lever along said ratchet bar comprising a separate control lever pivotally mounted in said control unit housing, said control lever being movable relative to said latch lever during a portion of the movement of the former and during another portion of said movement being movable unitarily therewith, means operable during said relative movement of the control and latch levers for moving said ratchet pawl toward said ratchet bar, and means for moving said ratchet pawl away from said ratchet bar.

5. A direction signal comprising a signal unit having an enclosure housing provided with an opening, a rotor journaled in said enclosure housing, a semaphore arm carried by said rotor and movable exteriorly of said enclosure housing, through said opening thereof, into one of a series of signaling positions, a drive shaft journaled in said enclosure housing, means connecting said rotor and drive shaft together for synchronous rotation, a control unit, positioned at a distance from said signal unit, comprising a housing having a rotary element therein connected with said drive shaft, a latch lever connected with and to rotate said rotary element, an arcuate ratchet bar having therein a series of notches defining signaling positions, a ratchet pawl movably mounted on said ratchet lever and adapted to be reciprocally moved toward and from said ratchet bar so as to engage one of said notches thereof, means for moving said latch lever along said ratchet bar comprising a separate control lever pivotally mounted in said control unit housing, said control lever being movable relative to said latch lever during a portion of the movement of the former and during another portion of said movement being movable unitarily therewith, means operable during said relative movement of the control and latch levers for rapidly moving said ratchet pawl in one direction toward said ratchet bar, and means for moving said ratchet, at a materially slower rate, in a direction away from said ratchet bar.

6. A direction signal comprising a signal unit having an enclosure housing provided with an opening, a single element for securing said enclosure housing to a supporting structure, a rotor journaled in said enclosure housing adjacent an end of the opening thereof, a drive shaft journaled in said enclosure housing, a flexible drive element connecting said drive shaft and said rotor together for synchronous rotation, a semaphore arm carried by said rotor and movable, upon rotation of said rotor, exteriorly of said enclosure housing through the opening thereof into one of a series of signaling positions, a vane carried by said semaphore arm and angularly intersecting the longitudinal axis thereof, said vane being adapted to be engaged by air currents to produce a force on said semaphore arm tending to move the latter from an exposed signaling position to a position within the enclosure housing, a control unit mounted on said supporting structure and separated from said signal unit, a rotary element carrying a radially extending shaft lever, journaled in said control housing and connected with said drive shaft, a latch lever pivotally mounted in said control housing and engaged for movement therein with said shaft lever, an arcuate ratchet bar in said control housing having a series of spaced notches therein defining signaling positions, a latch pawl carried by said latch lever and reciprocally movable toward and from said ratchet bar to be engaged with and released from a notch thereof, a control lever pivotally mounted, and adapted to be manually moved, in said control housing, means connecting said control lever to rapidly move said latch pawl toward said ratchet bar, and means for slowly moving said ratchet pawl away from said ratchet bar.

7. A direction signal comprising a signal unit having an enclosure housing provided with an opening, a single element for securing said enclosure housing to a supporting structure, a rotor journaled in said enclosure housing adjacent an end of the opening thereof, a drive shaft journaled in said enclosure housing, a flexible drive element connecting said drive shaft and said rotor together for synchronous rotation, a semaphore arm carried by said rotor and movable, upon rotation of said rotor, exteriorly of said enclosure housing through the opening thereof into one of a series of signaling positions, a vane carried by said semaphore arm and angularly intersecting the longitudinal axis thereof, said vane being adapted to be engaged by air currents to produce a force on said semaphore arm tending to move the latter from an exposed signaling position to a position within the enclosure housing, a control unit mounted on said supporting structure and separated from said signal unit, a rotary element carrying a radially extending shaft lever, journaled in said control housing and connected with said drive shaft, a latch lever pivotally mounted in said control housing and engaged for movement therein with said shaft lever, an arcuate ratchet bar in said control housing having a series of spaced notches therein defining signaling positions, a latch pawl carried by said latch lever and reciprocally movable toward and from said ratchet bar to be engaged with and released from a notch thereof, a control lever pivotally mounted, and adapted to be manually moved, in said control housing, a timer connected with and to govern movement of said ratchet pawl away from said ratchet bar, and means connecting said control lever to move said latch pawl toward said ratchet bar.

8. A direction signal comprising a signal unit having an enclosure housing provided with an opening, a single element for securing said enclosure housing to a supporting structure, a rotor journaled in said enclosure housing adjacent an end of the opening thereof, a drive shaft journaled in said enclosure housing, a flexible drive element connecting said drive shaft and said rotor together for synchronous rotation, a semaphore arm carried by said rotor and movable, upon rotation of said rotor, exteriorly of said enclosure housing through the opening thereof into one of a series of signaling positions, a vane carried by said semaphore arm and angularly intersecting the longitudinal axis thereof, said vane being adapted to be engaged by air currents to produce a force on said semaphore arm tending to move the latter from an exposed signaling position to a position within the enclosure housing, a control unit mounted on said supporting structure and separated from said signal unit, a rotary element carrying a radially extending shaft lever, journaled in said control housing and connected with said drive shaft, a latch lever pivotally mounted in said control housing and engaged for movement therein with said shaft lever, an arcuate ratchet bar in said control housing having a series of spaced notches therein defining signaling positions, a latch pawl carried by said latch lever and reciprocally movable toward and from said ratchet bar to be engaged with and released from a notch thereof, a control lever pivotally mounted, and adapted to be manually moved, in said control housing, a timer, having an actuating element, connected with and to govern movement of said ratchet pawl away from said ratchet bar, and means carried by said control lever and engaged with the actuating element of the timer, and operable upon movement of said control lever, for actuating said timer.

9. A direction signal comprising a signal unit having an enclosure housing provided with an opening, a single element for securing said enclosure housing to a supporting structure, a cylindrical rotor journaled in said enclosure housing adjacent an end of the opening thereof, a drive shaft journaled in said enclosure housing, said drive shaft having spaced reel drums mounted on and rotatable therewith, a flexible metallic ribbon secured, medially of its ends, to the periphery of said rotor and, at its respective ends to said reel drums, said flexible ribbon being passed in opposite directions around the respective reel drums, a semaphore arm carried by said rotor and adapted, upon rotary movement of the latter, to move out of said enclosure housing, through the opening thereof, into one of a series of exposed signaling positions, said semaphore arm having a recessed portion thereof which, when the semaphore arm is within the enclosure housing, encloses said reel drums and said flexible ribbon, said semaphore arm being further provided with a vane angularly intersecting the longitudinal axis of the arm and adapted to be engaged by air currents, through which the vane may be passed, to produce a force tending to move the semaphore arm from a said exposed signaling position to a position within the enclosure housing, a control unit comprising a housing mounted on said supporting structure in remote relation to said signal unit, a latch lever pivotally mounted in said control unit housing and provided with an elongated slot, a shaft lever pivotally mounted in said control unit housing adjacent the ratchet lever and connected with and to rotate said drive shaft, a crank pin, carried by said shaft lever, engaged in the elongated slot of said ratchet lever for connecting the shaft and ratchet levers together for simultaneous movement, a ratchet bar, mounted in said control unit housing, provided with a series of relatively spaced ratchet notches, means connected with said latch lever for forcibly urging the latter toward a side of the control unit housing, a latch pawl carried by said ratchet lever and reciprocally movable toward and from said ratchet bar to engage and be released from a notch thereof, a spring-operated gear-train timer carried by said latch lever and provided with a winding shaft equipped with a pinion gear, said timer further having a reciprocable element connected with and to move said ratchet pawl toward and from said ratchet bar, a control lever pivotally mounted in said control unit housing and engageable, during pivotal movement thereof, with and to move said ratchet lever in unison therewith, and a rack carried by said control lever and in mesh with said pinion gear for rotating said pinion gear and said timer winding shaft upon movement of said control lever.

10. A vehicle direction signaling system having in combination a semaphore arm rotatively supported at one end so as to be movable to a plurality of different radial positions, a latch lever pivotally supported at one end at a position distant from said semaphore, a spring engaging said latch lever to move the same to a predetermined normal position, means connected with said latch lever and operated by movements thereof for imparting movements to said semaphore, means for releasably locking said latch lever at any one of a plurality of selective positions, timing means carried by the latch lever for automatically freeing the latter for return to its said normal position, means for moving said latch lever against the tension of said spring, and means operated by movement of the last mentioned moving means in one direction for energizing and setting said timing means.

11. A vehicle direction signaling system having in combination a semaphore arm rotatively supported at one end so as to be movable to a plurality of different radial positions, a latch lever pivotally supported at one end, a spring acting to urge said latch lever to a predetermined normal position, a latch member carried by said lever at the other end thereof, lock means complemental to said latch member and positioned adjacent the path of movement of the last mentioned end of the latch lever, means connected with said latch lever and operated by movements thereof for imparting movements to said semaphore, timing means carried by the latch lever and connected with said latch member for automatically freeing the latch lever for return to its normal position, manual means for moving the latch lever against the tension of said spring, and means operated by movement of said manual means in one direction for energizing and setting said timing means.

12. A vehicle direction signaling system having in combination a semaphore arm rotatively supported at one end so as to be movable to a plurality of different radial positions, a latch lever pivotally supported at one end at a position distant from the semaphore, a spring for moving said latch lever to a predetermined normal position, means for releasably locking said latch lever at any one of a plurality of selective positions, timing means carried by the latch lever for automatically freeing said lever for return to said normal position, means connected with said latch lever and operated by movements thereof for imparting movements to said semaphore, a manual operating lever pivoted at one end, means connected with said manual lever for engaging and moving said latch lever, and means operated by movement of said manual lever in one direction for energizing and setting said timing mechanism.

13. A vehicle direction signaling system having in combination a semaphore arm rotatively supported at one end so as to be movable to a plurality of different radial positions, a latch lever pivotally supported at one end, means connected with said latch lever and operated by movements thereof for imparting movements to said semaphore, latch means carried by said latch lever adjacent the other end thereof, an arcuate lock plate complemental to said latch means and positioned adjacent the path of movement of the last mentioned end of the latch lever, timing means carried by the latch lever for automatically freeing said lever for return to its normal position, a manual operating lever for moving said latch lever against the tension of its spring, and means operated by movements of the manual lever for setting said timing mechanism.

14. In a vehicle direction signaling system, the combination of a latch lever pivotally supported at one end, a spring for moving said latch lever to a predetermined normal position, means for releasably locking said latch lever at any one of a plurality of selective positions, timing means carried by the latch lever for automatically freeing said lever for return to its said normal position, means for energizing and setting said timing means and a semaphore-actuating member engaged and movable with said latch member.

15. A vehicle direction signaling system having in combination a rotatively supported actuator, a semaphore arm secured at one end to said actuator so as to be movable to a plurality of different signaling positions, a latch lever movably supported at a distance from said actuator, means connected to said latch lever and operated by movements thereof to impart rotative movements to said rotative actuator, means for releasably engaging said latch lever at a plurality of selective positions, timing means carried by said latch lever for automatically releasing it from said locking means after the lapse of an interval of time, a manual lever for operating said latch lever, and means operated by movement of said manual lever in one direction for setting the latch lever releasing means.

ERNEST LORENZO RAIRDON.